(12) United States Patent
Rossetti (10) Patent No.: US 11,135,907 B2
(45) Date of Patent: Oct. 5, 2021

(54) BODYWORK FOR A TWO-WHEELED VEHICLE

(71) Applicant: AUDI AG, Ingolstadt (DE)

(72) Inventor: Mario Rossetti, Neudenau (DE)

(73) Assignee: AUDI AG, Ingolstadt (DE)

( * ) Notice: Subject to any disclaimer, the term of this patent is extended or adjusted under 35 U.S.C. 154(b) by 523 days.

(21) Appl. No.: 16/091,268

(22) PCT Filed: Apr. 13, 2018

(86) PCT No.: PCT/EP2018/059495
§ 371 (c)(1),
(2) Date: Oct. 4, 2018

(87) PCT Pub. No.: WO2018/189357
PCT Pub. Date: Oct. 18, 2018

(65) Prior Publication Data
US 2021/0206248 A1   Jul. 8, 2021

(30) Foreign Application Priority Data
Apr. 15, 2017  (DE) .................. 10 2017 003 689.6

(51) Int. Cl.
*B60J 7/20* (2006.01)
*B62J 17/086* (2020.01)
*B62K 11/02* (2006.01)

(52) U.S. Cl.
CPC ............. *B60J 7/201* (2013.01); *B62J 17/086* (2020.02); *B62K 11/02* (2013.01); *B62K 2202/00* (2013.01)

(58) Field of Classification Search
CPC . B60J 1/201; B60J 7/1678; B62J 17/08; B62J 2017/086
See application file for complete search history.

(56) References Cited

U.S. PATENT DOCUMENTS 4,632,448 A * 12/1986 Yagasaki .................... B60J 7/08
296/102
9,422,020 B2 * 8/2016 Kim ......................... B62J 17/08
(Continued)

FOREIGN PATENT DOCUMENTS

CN          2626829 Y    7/2004
CN        105270520 A    1/2016
(Continued)

OTHER PUBLICATIONS

Chinese Office Action dated Nov. 12, 2019, in connection with corresponding CN Application No. 201880001935.8 (11 pgs., including machine-generated English translation).
(Continued)

*Primary Examiner* — Joseph D. Pape
(74) *Attorney, Agent, or Firm* — Maier & Maier, PLLC (57) ABSTRACT

A bodywork for a two-wheeled vehicle, in particular a scooter, has a roof element and a storage compartment. The roof element has at least two roof struts and a cover for the storage compartment. The roof element is mounted so as to pivot around an axis of pivot between at least two positions. In a first, lower position of the roof element, the roof struts are arranged in a stored position, the storage compartment has a reduced volume and is closed by the cover. In a second, upper position, the roof struts are arranged above a driver's seat and the storage compartment has an enlarged volume.

20 Claims, 5 Drawing Sheets

(56) References Cited

U.S. PATENT DOCUMENTS

2006/0244284 A1 11/2006 Solo et al.
2014/0312644 A1 10/2014 Srabstein

FOREIGN PATENT DOCUMENTS

| DE | 83 1 3 054 U1 | 2/1984 |
| DE | 94 10 306 U1 | 9/1994 |
| EP | 0 891 920 A2 | 1/1999 |
| EP | 1 084 944 A2 | 3/2001 |
| EP | 1 897 736 A2 | 3/2008 |
| JP | 10-258783 A | 9/1998 |

OTHER PUBLICATIONS

Examination Report dated Jan. 12, 2018 of corresponding German application No. 10 2017 003 689.6; 4 pgs.
International Search Report and Written Opinion of the International Search Authority dated Jul. 20, 2018 of corresponding International application No. PCT/EP2018/059495; 15 pgs.

* cited by examiner

BODYWORK FOR A TWO-WHEELED VEHICLE

FIELD

A bodywork for a two-wheeled vehicle, in particular a scooter, with a roof element and with a storage compartment.

BACKGROUND

Known from EP 1 084 944 A2 is a scooter with a foldable roof, which can be shifted between a position covering the driver and a position stored in a corresponding housing. However, such a foldable roof is relatively expensive and, in its stored position, takes up the complete volume of possible storage that would otherwise be available in the housing.

Known from US 2014/0312644 A1 is a two-wheeled vehicle with an adjustable windshield having a plurality of segments that can slide together. Besides the quite unstable construction, this solution has the drawback that no storage space whatsoever is available.

Especially in metropolitan centers in which very many and very long traffic jams and other traffic impediments are a daily occurrence, parcel carriers and similar service providers are increasingly often switching to two-wheeled vehicles, because, in this way, it is easier to move forward on congested streets. A very good example of this is provided by bicycle couriers, which have existed for a long time and are often employed for very small shipments in terms of volume, but are of special urgency.

However, a drawback of all two-wheeled vehicles that are available for this purpose is, on the one hand, poor wind and weather protection, and, on the other hand, in particular, the low transport capacity of two-wheeled vehicles. This makes it necessary either for the parcel carrier to turn back often to a shipping station or makes possible only the transport of relatively small shipments.

On account of the unsatisfactory traffic situation in the inner cities, private individuals also are utilizing two-wheeled vehicles ever more often. However, for this group of persons also, a satisfactory design is still not available.

SUMMARY

The object of the present invention is therefore to create a bodywork for a two-wheeled vehicle that offers a good wind and weather protection, a large transport capacity for two-wheeled vehicles, and nonetheless is not inferior to the known solutions in terms of the maneuverability thereof in street traffic.

Accordingly, the bodywork according to the invention has a roof element that is mounted so as to pivot between at least two positions, as a result of which it is possible to utilize the two-wheeled vehicle in a lower or opened position of the roof element, for example, when a smaller load volume is needed and/or when no protection against poor weather is required. In the upper, closed position of the roof element, the user of the two-wheeled vehicle can utilize said vehicle even in poor weather situations, because, in this position, the roof element offers a corresponding protection. Furthermore, in this position of the roof element, an enlarged storage compartment is obtained, so that the two-wheeled vehicle has a larger load capacity and, accordingly, it is possible to transport larger parcels or the like. Due to the fact that the storage compartment, which is closed by the cover, belongs to the roof element, in contrast, an especially good protection for the goods arranged therein is ensured.

The pivotable mounting of the roof element in accordance with the invention results not only in a very simple construction, but also in a simple shift in position of the same. In this case, in the lower position of the roof element, the roof struts are situated in a stored position and, accordingly, do not create any interference with the regular operation of the two-wheeled vehicle.

In order to ensure a safe operation of the two-wheeled vehicle, in a very advantageous enhancement of the invention, it can be provided that the roof element is lockable in its two positions.

Furthermore, in one embodiment of the invention, it can be provided that, in the upper position of the roof element, the roof struts are connected to a windshield frame. This connection of the roof element to the windshield frame results not only in a continuous roof that accordingly offers an especially good wind and weather protection, but also leads to an increase in the rigidity of the bodywork according to the invention.

This high rigidity of the bodywork can be improved still further in that, in another advantageous embodiment of the invention, the roof struts can be locked to the windshield frame.

Furthermore, it can be provided that the axis of pivot is arranged in a rear region of the bodywork. This enables the user to have a very simple access to the storage compartment in its opened state that results in the upper position of the roof element. Furthermore, in this way, moving parts in the rearmost region of the bodywork are avoided.

In order to improve the weather protection and in order to be able to provide a flexible configuration, it can further be provided that a covering element, which can be adjusted between an opened position and a closed position, is arranged between the roof struts.

A good protection for the covering element in its opened position is obtained when the covering element can be accommodated in a receiver in the storage compartment.

Furthermore, it can be provided that the roof struts can be retracted into the roof element. In this way, it is possible to take up the roof struts completely in the roof element, as a result of which a larger free space is obtained in the region to the side of the driver's seat.

In another very advantageous embodiment of the invention, when an electric motor, which is arranged in a wheel hub, is provided as the drive source for the two-wheeled vehicle, an especially environmentally friendly operation of the two-wheeled vehicle having the bodywork according to the invention is possible. This is advantageous particularly in regard to the use of the two-wheeled vehicle in metropolitan centers, because, already at the present time, vehicles equipped with certain drives are prohibited from driving and it is highly likely that the number of such vehicles will increase in the future.

Furthermore, it can be provided that, in a floor assembly of the bodywork, at least one battery that supplies the electric motor with electric power is arranged. Such an arrangement of the battery or batteries that serve for supplying electric power to the electric motor is, on the one hand, very space-saving and, on the other hand, provides for a low center of gravity of the bodywork according to the invention, thereby substantially improving the driving behavior of the two-wheeled vehicle having the bodywork.

BRIEF DESCRIPTION OF THE DRAWINGS

Exemplary embodiments of the invention will be discussed below in terms of the principle thereof on the basis of the drawing.

Shown are.

DETAILED DESCRIPTION

Figure 1:
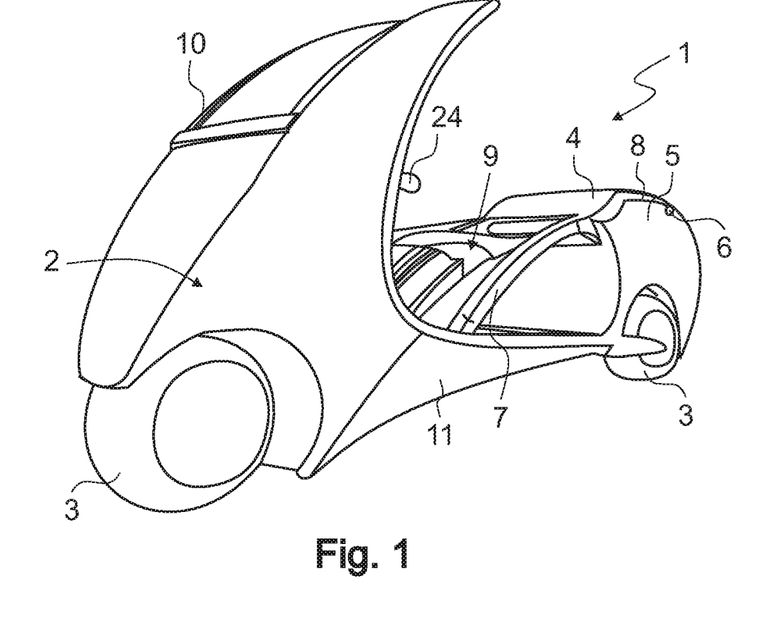
FIG. 1 a perspective view of a two-wheeled vehicle according to the invention with a roof element in a first position.

FIG. 1 shows a two-wheeled vehicle 1, in the present case a scooter, with a bodywork 2. Attached to the bodywork 2 are, among other things, two wheels 3, which can be seen better in the side views of FIGS. 2 and 3.

Figure 2:
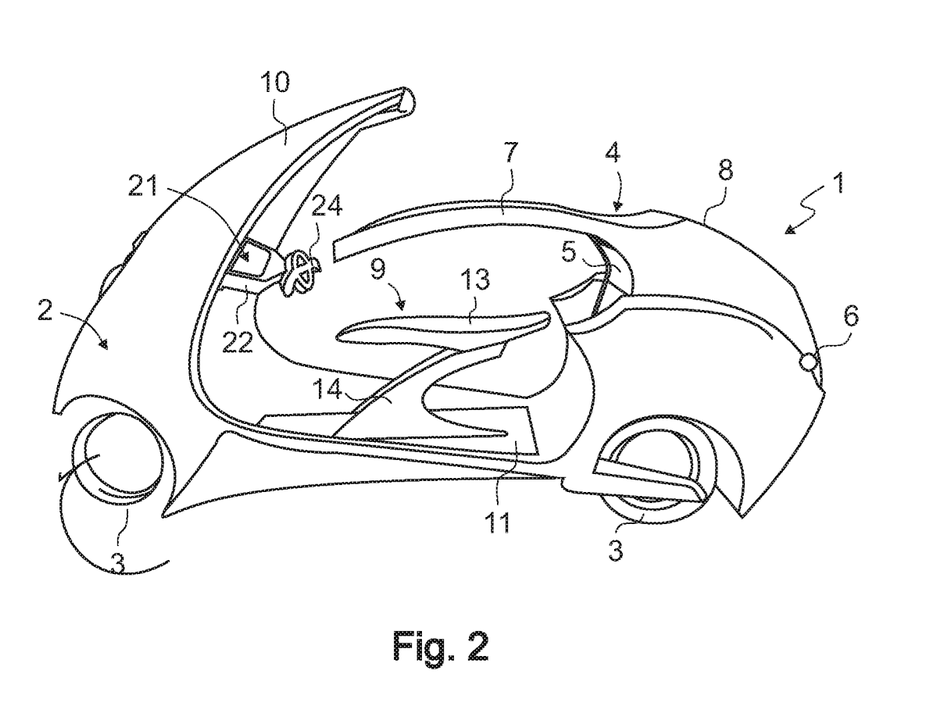
FIG. 2 a side view of the two-wheeled vehicle from FIG. 1 with the roof element in an intermediate position.
Figure 3:
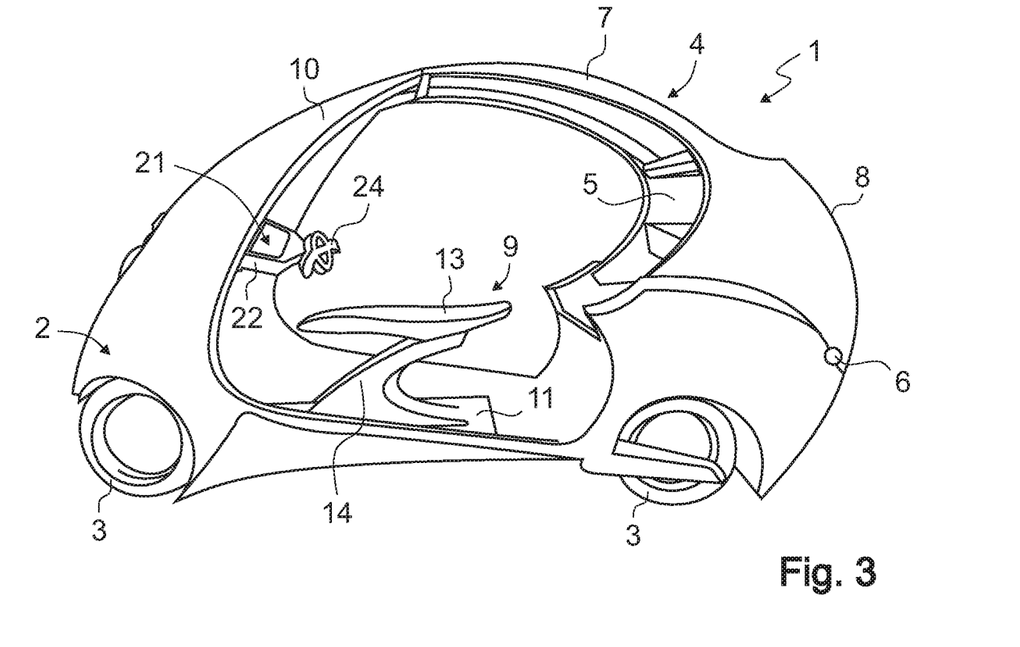
FIG. 3 the two-wheeled vehicle from FIG. 2 with the roof element in a second position.

The bodywork 2 has a roof element 4 and a storage compartment 5. As described in detail below, the roof element 4 is mounted on an axis of pivot 6 so as to be able to pivot between at least two positions. In this case, FIG. 1 shows a first, lower position of the roof element 4; FIG. 2 shows an intermediate position of the roof element 4; and FIG. 3 shows a second, upper position thereof. In the present case, the axis of pivot 6 is provided in a rear region of the bodywork 2, thereby leading to an optimal usability of the storage compartment 5. The axis of pivot 6 of the roof element 4 can be realized with respect to the bodywork 2 in a known manner.

Figure 4:
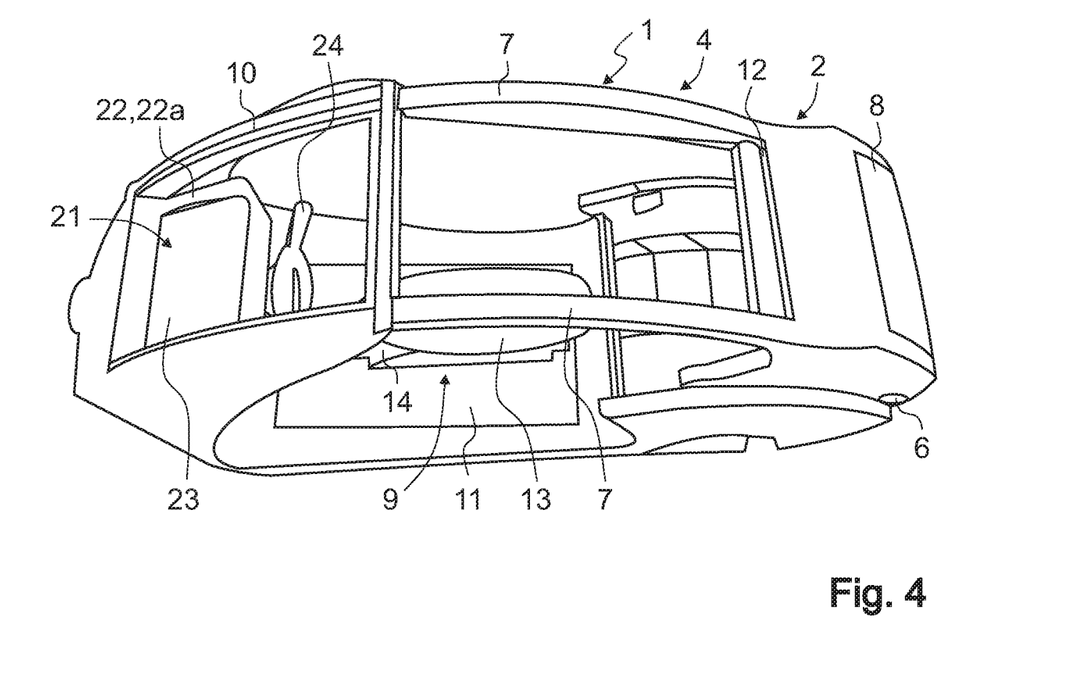
FIG. 4 a plan view of the two-wheeled vehicle in accordance with FIGS. 1 to 3 with a covering element in a first position.
Figure 5:
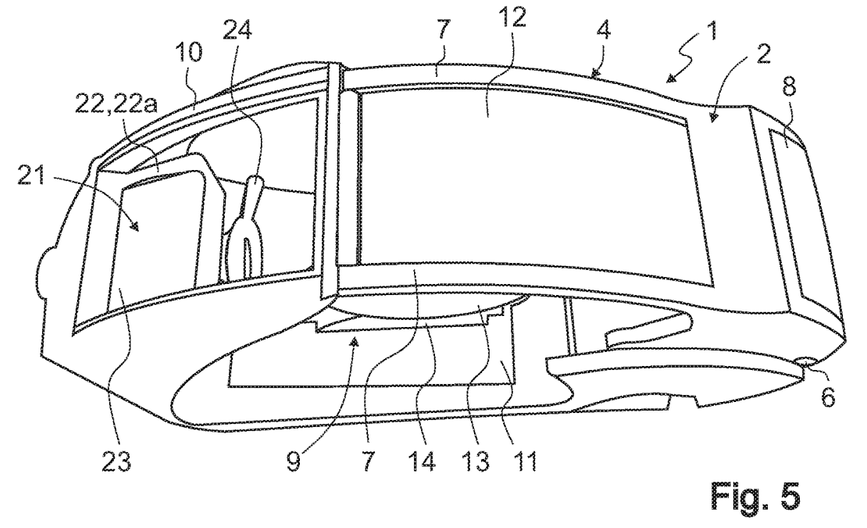
FIG. 5 a plan view in accordance with FIG. 4 with a covering element in a second position.

As can also be seen in FIGS. 1 to 3 as well as in the plan views of FIGS. 4 and 5, the roof element 4 has two roof rails or roof struts 7 that extend parallel to each other. The roof struts 7 are connected to a cover 8 for the storage compartment 5 or are designed in one piece therewith, said cover likewise being a part of the roof element 4 and moving with it.

In FIG. 1, it can be seen that, in the first, lower position of the roof element 4, the roof struts 7 are arranged lateral to a driver's seat 9 of the bodywork 2 of the two-wheeled vehicle 1. In this first, lower position of the roof element 4, the storage compartment 5 has a reduced volume and is closed by means of the cover 8. In contrast, in the second, upper position of the roof element 4, the roof struts 7 are arranged above the driver's seat 9 and the storage compartment 5 has an enlarged volume. In this position of the roof element 4, the volume of the storage compartment 5 can be, for example 120-150 liters. In this position of the roof element 4, which is illustrated in FIG. 3, it is possible for a driver, who is not illustrated and is seated on the driver's seat 9, to reach directly into the storage compartment 5, because, in this position of the roof element 4, said storage compartment is opened. Fundamentally, it would be conceivable to close this opening of the storage compartment 5 in the direction of the driver by means of a roll closure or a similar separating device.

Through the described embodiment of the roof element 4, in the lower position of the roof element 4, the two-wheeled vehicle 1 can be operated as a conventional scooter, which, however, in comparison to known scooters, has an enlarged transport volume as a result of the storage compartment 5. In the upper position of the roof element 4, a wind and weather protection for the driver as well as an enlarged transport volume results owing to the further enlarged volume of the storage compartment 5.

In this case, the curved shape of the roof element 4 with the roof struts 7 and the cover 8, in both positions of the roof element 4, results in a very harmonic overall appearance of the bodywork 2 and, accordingly, of the entire two-wheeled vehicle 1.

In its two positions, that is, in the first, lower position as well as in the second, upper position, the roof element 4 can be lockable. For example, in the present case, in the upper position of the roof element 4, the roof struts 7 are connected to a windshield frame 10 of the bodywork 2, and it can be provided that the roof struts 7 are designed so that they can lock to the windshield frame 10. Obviously, the locking of the roof struts 7 can occur in another region as well. In the lower position of the roof element 4, the locking of the roof struts 7 to a floor assembly 11 of the bodywork 2 of the two-wheeled vehicle 1 is also conceivable. For example, it is also possible, however, to lock the roof element 4 in the region of the axis of pivot 6, thereby enabling a locking of the roof element 4 in both positions, as well as, if need be, in intermediate positions. Combinations thereof are also conceivable.

In this case, the windshield frame 10 is extended relatively far upwards and accordingly offers a good wind and weather protection. The connection of the windshield frame 10 to the roof element 4 results in a bodywork 2 that is completely closed at least on the top side. In a way that is not illustrated, it is possible to provide corresponding coverings also in the two lateral regions of the bodywork 2, for example in the form of suitable tarps or films, in order to achieve an even better weather protection.

In a way that is not illustrated, the roof struts 7 can be designed such that they can be retracted into the roof element 4. As a result, the roof struts 7 would no longer be situated lateral to the driver's seat 9, but rather behind the latter. Improved spatial relationships thereby result, in particular for a vehicle occupant situated on the driver's seat 9. In their state in which they are retracted into the roof element 4, the roof struts 7 optionally can be locked.

In FIGS. 4 and 5, it can be seen that, between the roof struts 7, a covering element 12 is provided, which can be shifted between an opened position, which is nearly reached in FIG. 4, and a closed position, which is illustrated in FIG. 5. Obviously, intermediate positions of the covering element 12 are also conceivable. In the position of the roof element 4 in accordance with FIG. 1, the covering element 12 should be situated in its opened position, so that the roof element 4 can be brought into its lower position, without the covering element 12 colliding with the driver or with the driver's seat 9.

The covering element 12 can be accommodated in a receiver, which is not illustrated, in the storage compartment 5. There, the covering element 12 can be rolled up or wound up, for example, when it is made of a corresponding flexible material. Instead of a covering element 12 that can be wound up, the latter can be constructed from a plurality of parts and, optionally, can be foldable. Fundamentally, the covering element 12 can be made of a suitable plastic material, and in fact, a plastic film or a harder plastic material depending on the design.

It is possible that both the movement of the roof element 4 and the movement of the covering element 12 can result from and possibly be controlled by a pneumatic, hydraulic, or electric drive. In the case of such a control, it is obviously conceivable to bring the covering element 12 into its opened position before the roof element 4 is brought into its lower position. However, a purely manual actuation of the roof element 4 and/or of the covering element 12 is also conceivable.

For the drive of the two-wheeled vehicle 1, it is possible to provide an electric motor, which is not illustrated, as a drive source. Said electric motor can be arranged, for example, in a wheel hub of one of the wheels 3. Furthermore, batteries or at least one battery supplying said electric motor with electrical power can be arranged in the floor assembly 11 of the bodywork 2. However, this is also not illustrated in the figures. Optionally, the drive of the two-wheeled vehicle 1 can also be provided by way of a conventional internal combustion engine. Obviously, hybrid, plug-in hybrid, and other suitable drive sources are also possible.

Figure 6:
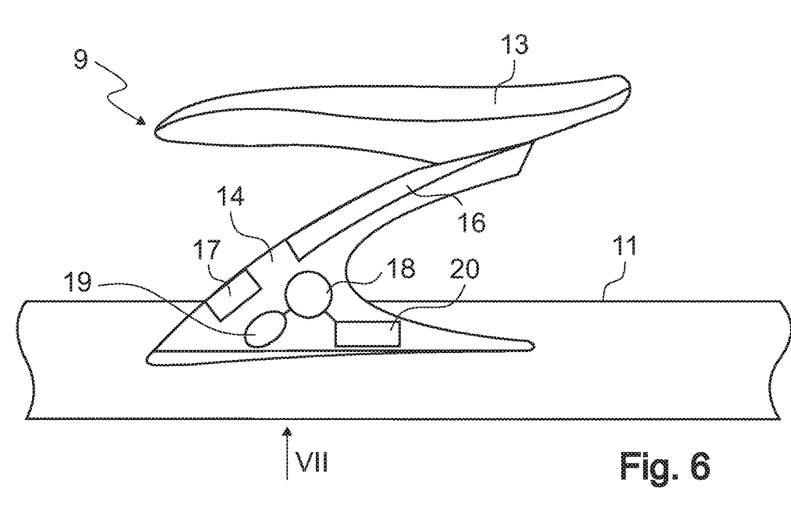
FIG. 6 a side view of a driver's seat of the two-wheeled vehicle.
Figure 7:
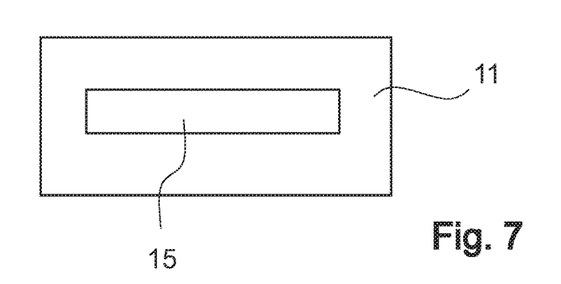
FIG. 7 a view in accordance with the arrow VII from FIG. 6.

FIGS. 6 and 7 show the driver's seat 9 of the two-wheeled vehicle 1 in a detailed illustration. The driver's seat 9 has a seat surface 13, which, in the present case, is formed as a double seat bench, and a console 14 for connection of the seat surface 13 to the bodywork 2—in the present case, to the floor assembly 11. In this case, the console 14 is arranged so as to shift in position with respect to the bodywork 2 in the longitudinal direction of the two-wheeled vehicle indicated by "x". With respect to the console 14, the seat surface 13 is arranged so as to shift in position at least in the vertical direction of the two-wheeled vehicle 1 indicated by "z".

As can be seen in the view of FIG. 7, the console 14 is borne in a guide 15 of the bodywork 2—in the present case, the floor assembly 11. In this case, the console 14 can be shifted continuously in the guide 15 and can be lockable with respect to the bodywork 2. For locking the console 14 relative to the guide 15 of the bodywork 2, it is possible to provide, for example, a quick release, which is not illustrated.

It ensues from FIG. 6 that the seat surface 13 is borne in a guide 16 in the console 14. In this case, the guide 16 extends in a curve, so that a shift in position of the seat surface 13 with respect to the console 14 in the vertical direction z entails a shift in position of the seat surface 13 also in the horizontal direction x. Preferably, the seat surface 13 can also be shifted continuously in the console 14.

In the exemplary embodiment illustrated, the guides 15 and 16 are each designed as a groove, in which a corresponding part of the console 14 or of the seat surface 13 engages.

In addition, the console 14 has a storage compartment 17, in which the user of the two-wheeled vehicle 1 can place various objects and which, optionally, can be closed with a cover, which is not illustrated. Furthermore, in the present case, parts of a drive device of the two-wheeled vehicle are arranged inside the console 14. Specifically, what can be involved here is a very schematically indicated electric motor 18, a transmission 19, and/or a battery 20. The electric motor 18, the transmission 19, and/or the battery 20 can be provided in addition to or instead of the above-described electric motor arranged in the wheel 3 and the above-described battery arranged in the floor assembly 11. The transmission 19 can be, for example, an automatic transmission, which can be designed, for example, as a belt transmission.

Figure 8:
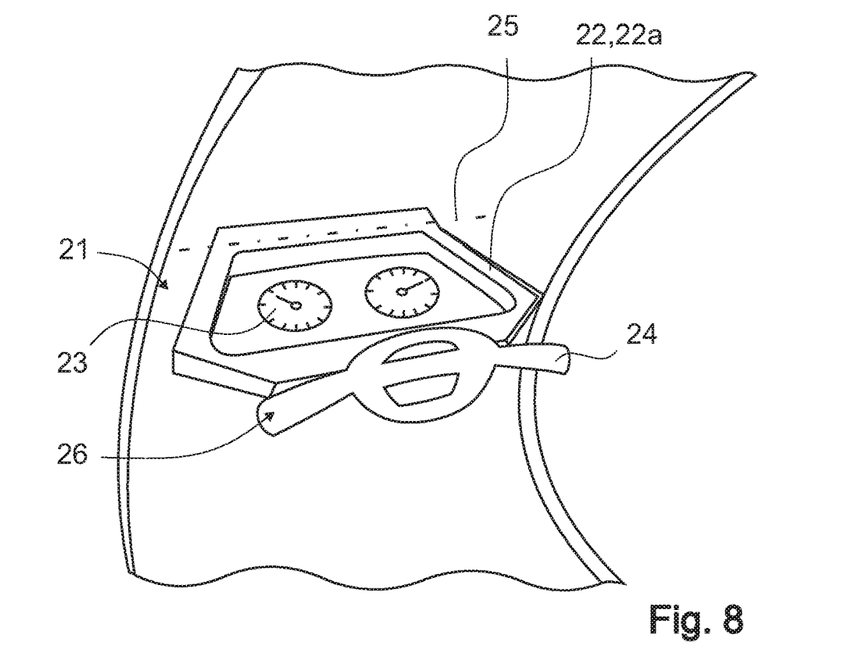
FIG. 8 a perspective view of a cockpit of the two-wheeled vehicle in a first position.
Figure 9:
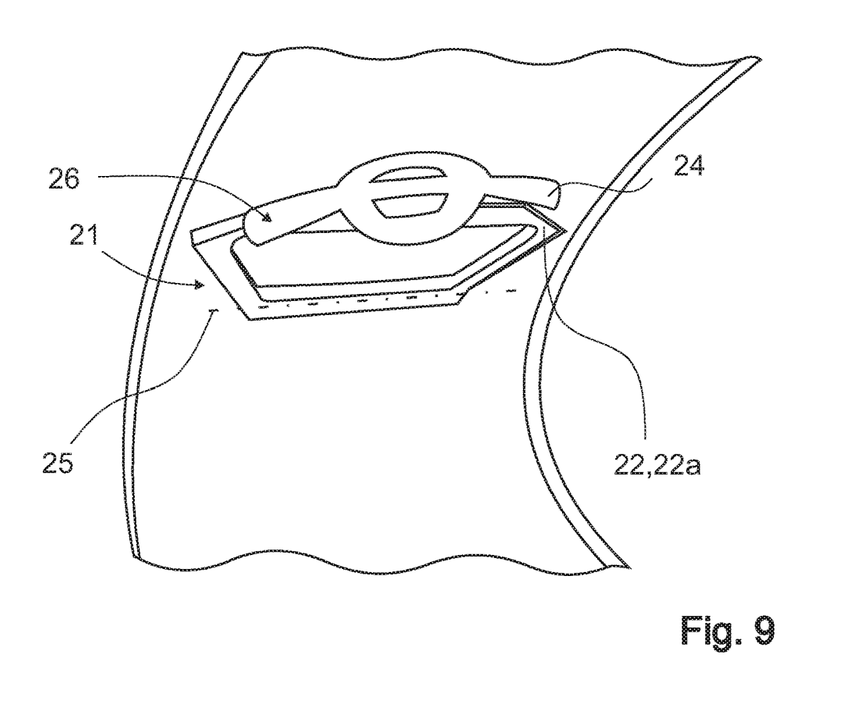
FIG. 9 a view of the cockpit in accordance with FIG. 8 in a second position.

FIGS. 8 and 9 show a cockpit 21 of the two-wheeled vehicle 1. The cockpit 21 has a base body 22, at which a display 23 and a handlebar or a steering handle 24 are attached.

In order to enable the cockpit to be adapted to different users or drivers of the two-wheeled vehicle 1, the base body 22 is pivotable on the bodywork 2 of the two-wheeled vehicle 1. In the present case, the base body 22 is connected to the bodywork 2 at an at least approximately horizontally extending axis of pivot 25. In this case, the axis of pivot 25 is situated in the region of the windshield frame 10.

It can be provided here that the base body 22 can be locked in at least two positions, and, optionally, also in a plurality of positions with respect to the bodywork 2. This lockability of the base body 22 with respect to the bodywork 2 can be ensured using a quick release or a similar device, which is not illustrated. Additionally or alternatively, it is also possible to arrange the base body 22 in defined locking positions with respect to the bodywork 2.

In the present case, the base body 22 is formed as a frame 22a, which surrounds the display 23 at least partially. In the illustrated exemplary embodiment, the frame 22a is trapezoidal in shape and surrounds the display 23 on all four sides.

The steering handle 24 or the handlebar has a plurality of control elements 26. In the present case, the control elements 26 comprise a throttle grip, a brake lever, and a blinker control. Obviously, additional control elements 26, such as, for example, a clutch lever, can be provided, or various control elements 26 can also be left out.

The connection from the steering handle 24 to the steered wheel 3 can also be shifted during this shift in position of the cockpit 21. Furthermore, this connection can also be designed as a so-called drive-by-wire steering that is known in and of itself, so that there is no mechanical connection between the steering handle 24 and the front wheel 3.

Figure 10:
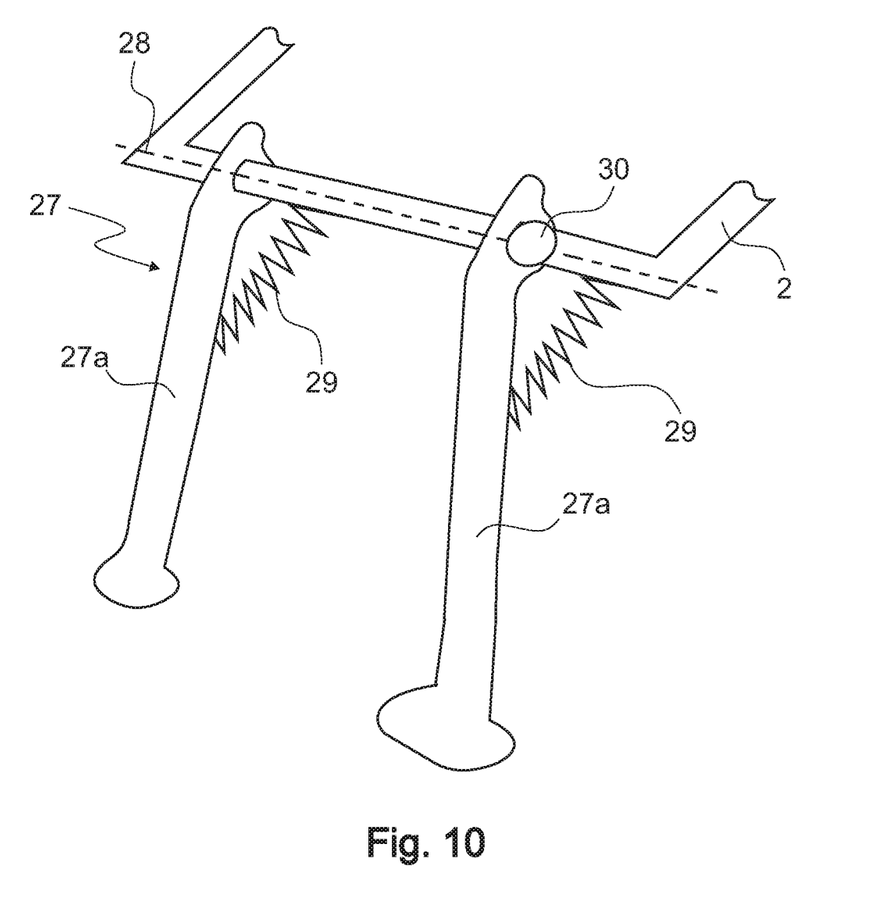
FIG. 10 a stand for the two-wheeled vehicle.

Illustrated in FIG. 10 is a stand 27, with which the two-wheeled vehicle 1 can be parked on the ground. The stand 27 has a stand section 27a, which is pivotably mounted between an upper position and a lower position on an axis of pivot 28 at the bodywork 2. In the lower position of the stand segment 27a, the stand 27 offers a support of the bodywork 2 and, accordingly, of the two-wheeled vehicle 1 on the ground.

Furthermore, the stand 27 has a spring element 29, which is designed such that it presses the stand segment 27a downward owing to the spring force. Serving to return the stand segment 27a to the upper position in the present case is a drive device, which is formed as an electric motor 30 and is capable of bringing about a pivoting movement of the stand segment 27a around its axis of pivot 28 at the bodywork 2. The electric motor 30 can be arranged, for example, directly at the axis of pivot 28, at which the stand 27 of the bodywork 2 is pivotably mounted.

In this case, the stand segment 27a can be moved downward into such a position that the wheels 3 nonetheless rest on the ground. In this way, the spring element 29 would have to be designed only strong enough therefor, and it would not be necessary for said spring element to raise the entire weight of the two-wheeled vehicle 1. In any case, the stand 27 will prevent the two-wheeled vehicle 1 from tipping over. At its lower end, the stand segment 27a can be provided with wheels, which are not illustrated, and which make possible a maneuvering of the two-wheeled vehicle 1 even when the stand 27 is unfolded down.

Furthermore, a locking device, which is not illustrated, can be provided, with which the stand segment 27a can be locked in the upper position, so that it is not necessary constantly to operate the electric motor 30 in order to keep the stand segment 27a in the upper position. In the present case, the stand segment 27a is essentially U-shaped in form. However, it would also be possible to provide two mutually independent stand segments 27a or solely one stand segment 27a, which would then be designed in the form of a side stand instead of in the form of a main stand.

All of the above-described lockings or locking devices of the individual components or elements of the two-wheeled vehicle 1 can be realized in a diversity of ways, such as, for example, manually, pneumatically, hydraulically, or electrically.

The invention claimed is:

1. A bodywork for a two-wheeled vehicle, comprising:
   a roof element at least partially defining a storage compartment,
   wherein the roof element has at least two roof struts and a cover for the storage compartment, wherein the roof element is mounted so as to pivot around an axis of pivot between at least two positions, wherein, in a first, lower position of the roof element, the roof struts are arranged in a stored position, the storage compartment has a reduced volume and is closed by means of the cover, and wherein, in a second, upper position, the roof struts are arranged above a driver's seat, and the storage compartment has an enlarged volume.

2. The bodywork according to claim 1, wherein the roof element is lockable at both of its positions.

3. The bodywork according to claim 1, wherein in the upper position of the roof element, the roof struts are connected to a windshield frame.

4. The bodywork according to claim 3, wherein the roof struts can be locked to the windshield frame.

5. The bodywork according to claim 1, wherein the axis of pivot is arranged in a rear region of the bodywork.

6. The bodywork according to claim 1, wherein a covering element, which can be adjusted between an opened position and a closed position, is arranged between the roof struts.

7. The bodywork according to claim 6, wherein the covering element can be accommodated in a receiver in the storage compartment.

8. The bodywork according to claim 1, wherein the roof struts can be retracted into the roof element.

9. The bodywork according to claim 1, wherein an electric motor arranged in a wheel hub is provided as a drive source for the two-wheeled vehicle.

10. The bodywork according to claim 9, wherein at least one battery that supplies the electric motor with electrical power is arranged in a floor assembly of the bodywork.

11. The bodywork according to claim 2, wherein in the upper position of the roof element, the roof struts are connected to a windshield frame.

12. The bodywork according to claim 2, wherein the axis of pivot is arranged in a rear region of the bodywork.

13. The bodywork according to claim 3, wherein the axis of pivot is arranged in a rear region of the bodywork.

14. The bodywork according to claim 4, wherein the axis of pivot is arranged in a rear region of the bodywork.

15. The bodywork according to claim 2, wherein a covering element, which can be adjusted between an opened position and a closed position, is arranged between the roof struts.

16. The bodywork according to claim 3, wherein a covering element, which can be adjusted between an opened position and a closed position, is arranged between the roof struts.

17. The bodywork according to claim 4, wherein a covering element, which can be adjusted between an opened position and a closed position, is arranged between the roof struts.

18. The bodywork according to claim 5, wherein a covering element, which can be adjusted between an opened position and a closed position, is arranged between the roof struts.

19. The bodywork according to claim 2, wherein the roof struts can be retracted into the roof element.

20. The bodywork according to claim 3, wherein the roof struts can be retracted into the roof element.

* * * * *